(12) United States Patent
Wang et al.

(10) Patent No.: US 8,990,565 B2
(45) Date of Patent: Mar. 24, 2015

(54) METHOD AND SYSTEM FOR AUTOMATICALLY LOGGING IN A CLIENT

(75) Inventors: Lei Wang, Shenzhen (CN); Jiangfeng Shang, Shenzhen (CN); Lijun Fang, Shenzhen (CN); Ke Yang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 88 days.

(21) Appl. No.: 13/259,203

(22) PCT Filed: Jun. 28, 2010

(86) PCT No.: PCT/CN2010/074576
§ 371 (c)(1),
(2), (4) Date: May 17, 2012

(87) PCT Pub. No.: WO2011/116555
PCT Pub. Date: Sep. 29, 2011

(65) Prior Publication Data
US 2012/0233462 A1    Sep. 13, 2012

(30) Foreign Application Priority Data
Mar. 22, 2010  (CN) .......................... 2010 1 0131300

(51) Int. Cl.
*H04L 29/06* (2006.01)
*G11B 20/00* (2006.01)

(52) U.S. Cl.
CPC ...... *H04L 63/0853* (2013.01); *G11B 20/00231* (2013.01); *H04L 63/083* (2013.01); *H04L 63/0876* (2013.01)
USPC ....................................... 713/168

(58) Field of Classification Search
CPC ...................................................... G06F 21/34
See application file for complete search history.

(56) References Cited

U.S. PATENT DOCUMENTS

2002/0059522 A1* 5/2002 Hirano et al. ................. 713/193
2002/0087867 A1* 7/2002 Oberle et al. ................. 713/183
(Continued)

FOREIGN PATENT DOCUMENTS

CN           1456998 A          11/2003
CN           1612148 A           5/2005
(Continued)

OTHER PUBLICATIONS

English Translation of PCT International Search Report for PCT/CN2010/074576, mailed Dec. 30, 2010 (4 pages).
(Continued)

*Primary Examiner* — Dede Zecher
*Assistant Examiner* — Abdullah Almamun
(74) *Attorney, Agent, or Firm* — Clark & Elbing LLP

(57) ABSTRACT

A method and system for automatically logging in a client is disclosed in the present invention, mainly comprising: use encrypted ICCID for the authentification of user's identity during automatic login; when authentification is passed, determine the account information corresponding to the identification of the client to be logged in currently by the user, and log in the client automatically with the determined account information, so that the user can conveniently manage the account information corresponding to each client when he guarantees the security of the account information simultaneously, avoiding the troublesome inputting of username and password of the account and achieving the purpose of automatically logging in a client.

7 Claims, 3 Drawing Sheets

(56) References Cited

U.S. PATENT DOCUMENTS

| | | |
|---|---|---|
| 2003/0210786 A1* | 11/2003 | Carr .............................. 380/241 |
| 2008/0184349 A1 | 7/2008 | Ting |
| 2009/0006852 A1* | 1/2009 | Qiu et al. ...................... 713/176 |
| 2009/0164801 A1* | 6/2009 | Kawahara ..................... 713/189 |
| 2009/0191846 A1* | 7/2009 | Shi ................................ 455/411 |
| 2010/0058453 A1* | 3/2010 | Lin .................................... 726/9 |
| 2010/0186083 A1* | 7/2010 | Shinzaki et al. ................. 726/19 |
| 2010/0317320 A1* | 12/2010 | Sakargayan .................. 455/410 |
| 2011/0179284 A1* | 7/2011 | Suzuki et al. ................. 713/186 |

FOREIGN PATENT DOCUMENTS

| | | |
|---|---|---|
| CN | 101588348 A | 11/2009 |
| EP | 1684460 A1 | 7/2006 |
| WO | WO 03096723 A1 | 11/2003 |

OTHER PUBLICATIONS

U.S. Appl. No. 07/271,603, Nov. 22, 2007, Ping Lee et al.
Supplementary European Search Report for European Application No. EP 10848217, mailed Sep. 6, 2012 (4 pages).

* cited by examiner

METHOD AND SYSTEM FOR AUTOMATICALLY LOGGING IN A CLIENT

FIELD OF THE INVENTION

This invention relates to the field of communication, especially to a method and system for automatically logging in a client.

BACKGROUND OF THE INVENTION

The rapid development of the Internet technology enables rich and colorful services to be provided for users, but many Internet services involve the problem of personal information security. In order to protect the security of personal information, the most common method is to use password. For example, a user is required to remember the password of each client when he logs in a client (instant messaging tool, email address, on-line game and forum community), which is rather difficult and troublesome for users. In order to remember them easily, many users set their passwords as easy and regular contents, and even set a same password for multiple client accounts, which greatly reduces the security of password. In order to enhance the security, it is desirable that a password is set meaningless, and constructed with longer content combined with multiple kinds of characters, signs and numbers; nevertheless such a password is difficult to remember.

For the conflict between the password security and easy to remember, some existing application software and browsers provide additionally automatically remembering passwords as well as the function of automatic login through a memorized password. However, a user still has to set and manage the password of each client, which is also quite troublesome. Therefore, software for unified management of username and passwords has been provided, through which a user can log in a client automatically with the user name and password under unified management. However, the passwords are usually stored in local hard disks for both of the above mentioned automatic login methods, and no strict identity authentication measures are taken; once a user's PC is available to another one, he can also get access to the stored accounts and passwords, bringing certain potential security problems.

Therefore, it is urgent now to find a method for automatically logging in a client so as to improve the security during automatically logging in a client.

SUMMARY OF THE INVENTION

The embodiment of this invention provides a method for automatically logging in a client, which is used to resolve the problem that the account information security of a user cannot be guaranteed during automatically logging in a client in the conventional art.

According to one aspect of this invention, a method for automatically logging in a client is provided. The method comprises:

decrypting the encrypted IC Card Identification (ICCID) of the Subscriber Identity Module according to the identity password information inputted by the user, and matching the decrypted ICCID with preset ICCID;

when the matching is successful, determining the account information corresponding to the identification of the client to be logged in currently by the user according to the correspondence relationship between the identification of the client and the account information; and, utilizing the determined account information to log in the client.

According to another aspect of this invention, a system for automatically logging in a client is provided. The system comprises:

decryption module, adapted to decrypt the encrypted ICCID of the Subscriber Identity Module according to the identity password information inputted by the user;

matching module, adapted to match the decrypted ICCID with the preset ICCID;

account determining module, adapted to determine the account information corresponding to the identification of the client to be logged in currently by the user according to the correspondence relationship between the identification of the client and the account information after the matching is successful; and, login module, adapted to log in the client with the determined account information.

The beneficial effects of the method and system for automatically logging in a client according to the embodiments of the present invention are provided as follows.

The embodiments of this invention authenticate user's identity according to the encrypted ICCID when automatic login is performed. When the authentication is passed, they allow automatically logging in a client with the account information corresponding to the identification of the client to be logged in currently by the user. Therefore a user can manage the account information corresponding to each client easily while the security of account information is guaranteed. Thus the embodiments of this invention avoid the troublesome inputting of username and password of the account and achieve the purpose of automatically logging in the client.

DETAILED DESCRIPTION OF THE EMBODIMENTS

The embodiment of this invention encrypts the IC Card Identification (ICCID) of the Subscriber Identity Module in the data card equipment by combining existing data card equipment with the User Interface (UI) in the terminal so as to protect the security of the account information stored in the data card equipment; performs authentication for user's identity with encrypted ICCID during automatic login, and allows automatically logging in a client with the account information corresponding to the identification of the client to be logged in currently by the user when the authentication is passed; therefore a user can manage the account information corresponding to each client easily when guaranteeing the security of account information simultaneously, thus avoiding the troublesome inputting of username and password of the account, and achieving the purpose of automatically logging in a client.

In the solution of each embodiment of this invention, when a user operates a client (such as operating application programs or surfing the Internet) through a terminal (such as a PC), he can connect the terminal with the data card equipment by USB, etc., and then performs security control of the password and automatically logs in a client with the information stored in the data card equipment. The Subscriber Identity Module in each embodiment of this invention can be SIM, UIM or USIM.

The embodiments of this invention will be described in detail hereinafter with reference to the drawings.

Embodiment One

Figure 1:
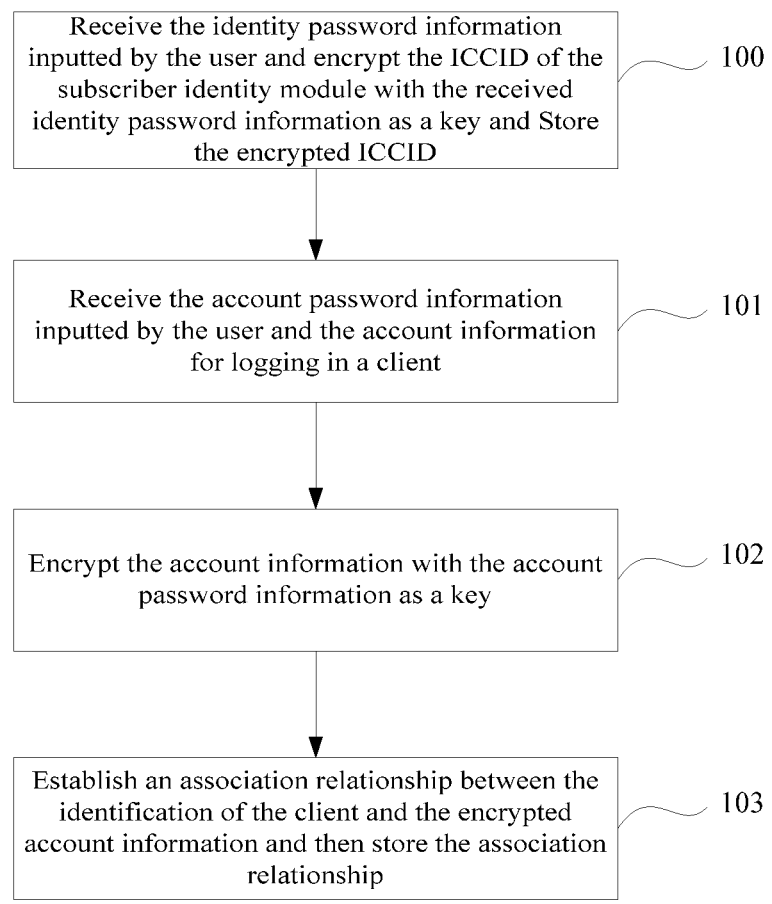
FIG. 1 is a schematic diagram of the method for safely controlling the password according to Embodiment One of this invention.

FIG. 1 is a schematic diagram of the method for security control of the password according to Embodiment One of this invention, the method comprises the following steps.

Step 101: Receive the account password information inputted by a user and the account information used for logging in a client.

The client that the embodiments of this invention relate to can be an application program or a web page etc. that a user expects to log in.

Each client that a user needs to log in has corresponding account information (comprising username and password); a user can successfully log in the client by inputting correct account information on the interface provided by the client to be logged in.

Step 102: Encrypt the account information with the account password information as a key.

Two kinds of encryption methods are available when the account information is encrypted with the account password information in this step, and they will be described respectively as follows.

The first situation for encrypting the account information is to respectively encrypt each of the account information.

In the first situation, a user can set account password information for each of the account information; data card equipment encrypts the corresponding account information by utilizing the received account password information. For example, if Account Information 1 is the account information for logging in Client 1, and Account Information 2 is the account information for logging in Client 2, a user can send to data card equipment Account Password Information 1 for Account Information 1 and Account Password Information 2 for Account Information 2. Then, the data card equipment can encrypt Account Information 1 with Account Password Information 1 and encrypt Account Information 2 with Account Password Information 2 respectively.

The second situation for encrypting account information is to encrypt all account information.

In the second situation, a user only needs to send one account password information to the data card equipment. The multiple account information sent to the data card equipment by the user can be regarded as a list of account information, so that the data card equipment can encrypt the list of account information comprising multiple account information with one account password information.

Step 103: Establish an association relationship between the identification of the client and the encrypted account information, and then store the association relationship.

The identification of the client varies depending on different clients. For example, when a client is an application program (i.e. the client of on-line game), it can be the name of the client; when a client is a web page, it can be the URL of the web page.

After establishing an association relationship between the identification of the client and the encrypted account information, the data card equipment can store the association relationship in the data card equipment; preferably, the data card equipment can store the association relationship in the Nonvolatile (NV) memory of the data card equipment.

In the solution of Embodiment One, whenever a user sets account information for a new client, the solution of Step 101 to Step 103 can be used to perform the security control for the account information that the user has set. By utilizing the solution of Embodiment One of the present invention, the security of the account information stored in the data card equipment can be improved.

In order to further improve the security of the account information, security protection can be performed for the data equipment storing the account information based on Embodiment One. The specific operations for the security control of the data card equipment can be carried out before Step 101, i.e. they can be carried out when a user initially uses data card equipment to securely store the account information. If so, the main content to be carried out comprises:

Step 100: Receive the identity password information inputted by a user, encrypt the ICCID of Subscriber Identity Module with the received identity password information as a key, and store the encrypted ICCID.

IC Card Identification (ICCID) is an identity number of Subscriber Identity Module. It is a 20-bit integer and stored in the EF file of the Subscriber Identity Module. Each Subscriber Identity Module has only one ICCID, and its value can only be read but cannot be modified.

When a user initially uses data card equipment to store account information, he can input identity password information on the interface provided by the data card equipment as a key for encryption and bind it with the ICCID of Subscriber Identity Module in the data card equipment, so that other users who do not use this Subscriber Identity Module cannot have access to the information stored in the data card equipment. Besides initially using data card equipment to store account information, a user can also encrypt ICCID with the reentered identity password information when a key needs updating.

Embodiment Two

Figure 2:
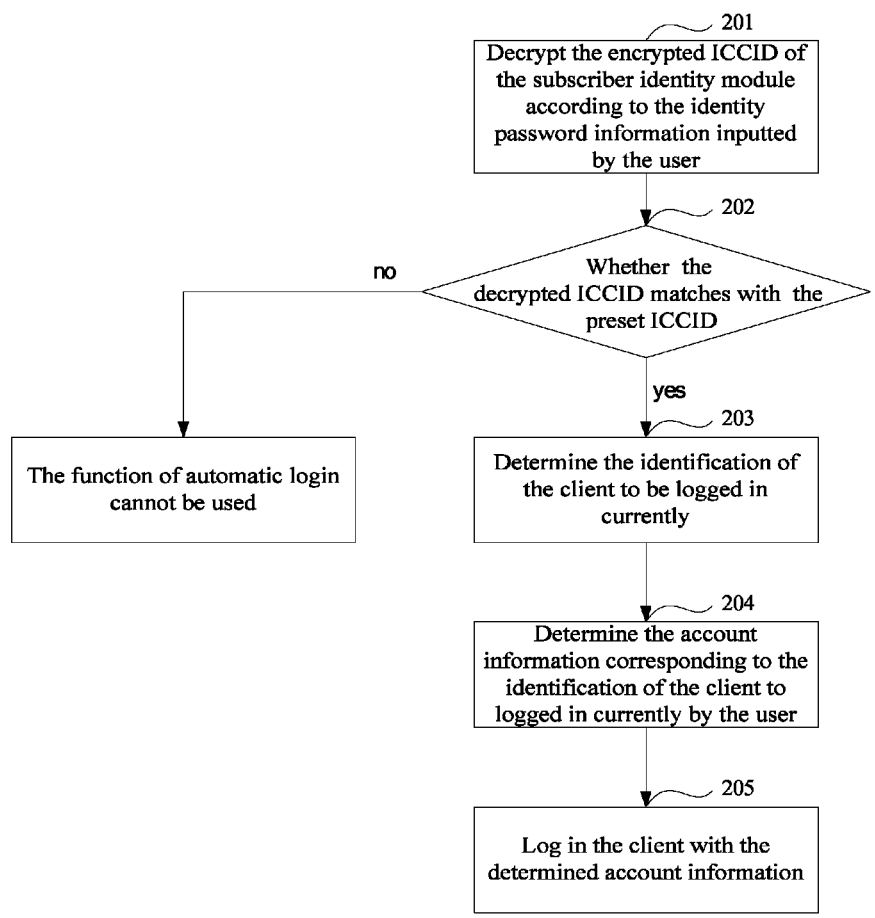
FIG. 2 is a schematic diagram of the method for automatically logging in a client according to Embodiment Two of this invention.

The Embodiment Two of this invention automatically logs in a client with the account information securely stored in the data card equipment, as shown in FIG. 2. The method for automatically logging in a client comprises the following steps.

Step 201: Decrypt the encrypted ICCID of Subscriber Identity Module according to identity password information inputted by a user.

A user needs to open the automatic login function at the UI of the terminal and then input identity password information for decryption when he wants to login automatically with the account information stored in the data card equipment. The identity password information in this step matches the Identity password information in the Step 100.

Before Step 201 is executed, the Identity password information inputted by a user can be received in advance. If so, use the received identity password information as a key to encrypt the ICCID of Subscriber Identity Module, and store the encrypted ICCID. Decrypt the stored encrypted ICCID when Step 201 is carried out.

Step 202: Determine whether the decrypted ICCID matches the preset ICCID, if yes, carry out Step 203; if No, UI will prompt user that the Subscriber Identity Module currently used is illegal or the identity password information is false, and the function of automatic login cannot be used.

The preset ICCID is the ICCID actually read from the Subscriber Identity Module of the data card equipment. If the identity password information inputted by the user in Step 201 is correct and the Subscriber Identity Module in the current data card equipment is the one bound with the identity password information inputted by the user, the decrypted ICCID and the ICCID currently read are the same.

Step 203: Determine the identification of the client to be logged in currently by the user.

In this step, when the decrypted ICCID matches the preset ICCID, it means that the identity authentication of the user is passed, and UI will capture the application programs and web pages operating on user's computer and determine whether the identifications of the application programs and web pages operating currently have associated account information.

Step 204: Determine the account information corresponding to the identification of the client to be logged in currently by the user according to the correspondence relationship between the identification of the client and the account information.

When the account information associated with the application programs and web pages currently operating is detected, reads corresponding account information from the NV of data card equipment.

Step 205: Log in the client with the determined account information.

Between Step 204 and Step 205, the determined account information corresponding to the identification of the client to be logged in currently by the user may be the encrypted account information; if so, the user also needs to input account password information, and then the determined account information will be decrypted according to the account password information inputted by the user so that the user can login the client with the decrypted account information in Step 205.

Before Step 201 is carried out, besides encrypting the ICCID, the account information inputted by the user can also be encrypted. If so, the process of encrypting and storing is:

First receive the account password information inputted by the user and the account information for logging in a client, then encrypt the account information inputted by the user with the account password information as a key, and finally establish an association relationship between the identification of the client and the encrypted account information and store the association relationship. Therefore, during the execution of Step 204, the account information corresponding to the identification of the client to be logged in currently by the user can be determined according to the correspondence relationship between the stored identification of the client and the encrypted account information; and in Step 205, the determined encrypted account information can be decrypted and the client can be logged in with decrypted account information.

There may be two methods for encrypting the account password information with the account password information as a key in Step 102 of Embodiment One. If the first method for encrypting each of the account information respectively is adopted, the user can be required to input corresponding account password information according to the determined account information in Step 204 so as to obtain the required account information for logging in a client. If the second method for encrypting all the account information is adopted, all the account information can be encrypted according to one account password information inputted by the user, and then the desirable account information can be selected for logging in a client.

In particular, if the identification of the client to be logged in currently corresponds with multiple account information, one account information can be selected out of the multiple accounts information according to the set condition, such as selecting according to the priority of the account information or the account information determined by the user. For example, the identification of the client to be logged in currently is URL of an email address, and the user has two accounts information of this email address, therefore one account information can be selected for automatic login according to the priority set by the user, or presenting two accounts information of the email address to the user and letting the user to determine one account information, and then selecting account information determined by the user for automatic login.

By utilizing the method for automatically logging in a client according to the Embodiment Two of the present invention, the conflict between password security and easy to memory can be coordinated; automatic login can be achieved on the condition that the password security is guaranteed; a user does not need to remember the account information corresponding to each client to be logged in, therefore avoiding the troublesome process of inputting account information and improving user's experience.

Embodiment Three

Embodiment Three of this invention will describe the solutions of Embodiment One and Embodiment Two of this invention in detail with specific examples. It is assumed in this embodiment that the Subscriber Identity Module is a SIM card.

Step one: Before automatic login is performed, a user initializes the setting of data card equipment and inputs identity password information into the data card equipment.

In this embodiment, the UI software that the user currently uses or UI software in data card equipment provides a friendly visual interaction interface for the user to input identity password information.

Step two: Read the ICCID of SIM card currently installed in the data card equipment, use the identity password information input by the user as a key, encrypt ICCID through 3DES algorithm, and store the encrypted ICCID in the NV.

Step three: The user inputs the identification of the client for automatic login and the account information for logging in the client.

Step four: Encrypt the received account information with the account password information inputted by the user and the 3DES algorithm.

Step five: Distribute the identification of automatic login client of the account information for the encrypted account information and store the encrypted account information as well as the correspondence relationship between the encrypted account information and the identification of the client in the NV.

Till now the initial setting of the data card equipment has been completed, and thus move to the stage of the operation for automatically logging in a client.

Step six: When operates the data card equipment, a user has to perform identity authentication first, and input identity password information to the data card equipment.

Step seven: Perform 3DES decryption for the ICCID stored in NV according to the received identity password information.

Step eight: Compare the decrypted ICCID with the ICCID of the SIM card in the data card equipment currently operating.

Step nine: The authentication of user's identity is passed if the decrypted ICCID and the ICCID of the SIM card in the data card equipment currently operating are the same.

Step ten: The UI software that the user currently uses or the UI software in the data card equipment captures the clients currently operating; once associated client identity is detected, it will read the corresponding account information from NV in the data card equipment.

Step eleven: Perform 3DES decryption with the account password information inputted by the user and obtain the original text of the account information, and then fill the decrypted account information into the corresponding application programs or web pages, therefore completing the automatic login.

With the method of Embodiment Three of this invention, data card equipment is used to achieve the security control of account information and automatic login, so that a user does not need to perform the troublesome operations of remembering passwords and filling in passwords when he enjoys the convenient network service simultaneously, thus improving the user's experience. Meanwhile data card identification is used for encrypted storage of the account information so as to achieve the physical isolation from local computer, thus improving the security of information storage. During automatic login, Subscriber Identity Module shall be used to authenticate the identity of a user, and the Subscriber Identity Module, as a smart card for identifying the identity of the user, possesses relatively higher security.

Embodiment Four

Figure 3:
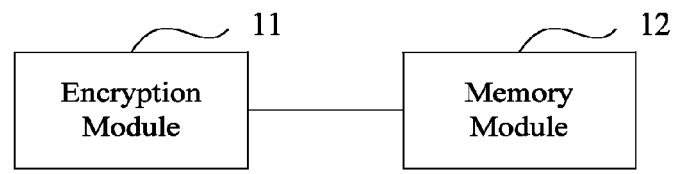
FIG. 3 is a structure diagram of the system for safely controlling the password according to Embodiment Four of this invention.

The Embodiment Four of this invention further provides a system for password security control. As shown in FIG. 3, the system comprises Encryption Module 11 and Memory Module 12, wherein: Encryption Module 11 is adapted to receive the account password information inputted by the user and the account information for logging in a client, and encrypt the account information with the account password information as a key; Memory Module 12 is adapted to establish an association relationship between the identification of the client and the encrypted account information and store the association relationship.

Encryption Module 11 is also adapted to receive the identity password information inputted by the user and encrypt the ICCID of Subscriber Identity Module with the received identity password information as a key; Memory Module 12 is also adapted to store the encrypted ICCID.

Each module in Embodiment Four of this invention can be integrated in the data card equipment.

Embodiment Five

Figure 4:
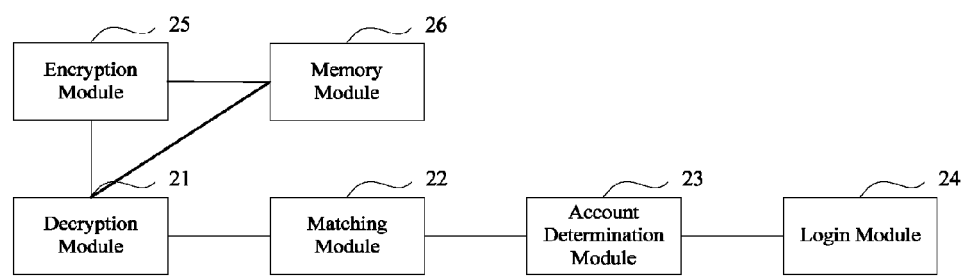
FIG. 4 is a structure diagram of the system for automatically logging in a client according to Embodiment Five of this invention.

The Embodiment Five of this invention further provides a system for automatically logging in a client. As shown in FIG. 4, the system comprises Decryption Module 21, Matching Module 22, Account Determination Module 23 and Login Module 24, wherein: Decryption module 21 is adapted to decrypt the ICCID of the decrypted Subscriber Identity Module according to the identity password information inputted by the user; Matching Module 22 is adapted to match the decrypted ICCID with the preset ICCID; Account Determination Module 23 is adapted to determine the account information corresponding to the identification of the client to be logged in currently by the user according to the correspondence relationship of the identification of the client and the account information when the matching is successful; Login Module 24 is adapted to log in the client through the determined account information.

The system also comprises encryption module 25 and memory module 26, wherein: encryption module 25 is adapted to receive the identity password information inputted by the user and encrypt the ICCID of Subscriber Identity Module with the received identity password information as a key; memory module 26 is adapted to store the encrypted ICCID.

Further, encryption module 25 is also adapted to receive the account password information inputted by the user and the account information for logging in a client, and encrypt the account information inputted by the user with the account password information as a key; memory module 26 is also adapted to establish an association relationship between the identification of the client and the encrypted account information and store the association relationship.

The decryption module 21 is also adapted to decrypt the determined account information according to the account password information inputted by the user; and the login module 24 is also adapted to log in the client with the decrypted account information.

Each module in Embodiment Five of this invention can be integrated in the data card equipment.

Those skilled in the art should understand that the embodiments of this application can be provided as method, system or products of computer programs. Therefore, this application can use the forms of entirely hardware embodiment, entirely software embodiment, or embodiment combining software and hardware. Moreover, this application can use the form of the product of computer programs to be carried out on one or multiple storage media (including but not limit to disk memory, CD-ROM, optical memory etc.) comprising programming codes that can be executed by computers.

This application is described with reference to the method, equipment (system) and the flow charts and/or block diagrams of computer program products according to the embodiments of the present invention. It should be understood that each flow and/or block in the flowchart and/or block diagrams as well as the combination of the flow and/or block in the flowchart and/or block diagram can be achieved through computer program commands Such computer program commands can be provided to general computers, special-purpose computers, embedded processors or any other processors of programmable data processing equipment so as to generate a machine, so that a device for realizing one or multiple flows in the flow diagram and/or the functions specified in one block or multiple blocks of the block diagram is generated by the commands to be executed by computers or any other processors of the programmable data processing equipment.

Such computer program commands can also be stored in readable memory of computers which can lead computers or other programmable data processing equipment to working in a specific style so that the commands stored in the readable memory of computers generate the product of command device; such command device can achieve one or multiple flows in the flowchart and/or the functions specified in one or multiple blocks of the block diagram.

Such computer program commands can also be loaded on computers or other programmable data processing equipment so as to carry out a series of operation steps on computers or other programmable equipment to generate the process to be achieved by computers, so that the commands to be executed by computers or other programmable equipment achieve the one or multiple flows in the flowchart and/or the functions specified in one block or multiple blocks of the block diagram.

Although preferred embodiments of this application are already described, once those skilled in the art understand basic creative concept, they can make additional modification and alteration for these embodiments. Therefore, the appended claims are intended to be interpreted as encompassing preferred embodiments and all the modifications and alterations within the scope of this application.

Apparently, those skilled in the art can make various modifications and alterations to this invention without deviating from the spirit and scope of this invention. Therefore, if such modifications and alterations belong to scope of the claims of this invention and their equivalent technology, this invention also intends to contain such modifications and alterations.

What is claimed is:

1. A method for automatically logging in a client, the method comprises:
   decrypting an encrypted IC Card Identification (ICCID) of a Subscriber Identity Module according to identity password information inputted by a user and matching the decrypted ICCID with a preset ICCID;
   when the matching is successful, determining account information corresponding to an identification of the client to be logged in currently by the user according to the correspondence relationship between the identification of the client stored in the Subscriber Identity Module and the account information;
   decrypting the determined account information according to account password information inputted by the user; and
   logging in the client with the decrypted determined account information.

2. The method according to claim 1, wherein before the user inputs the identity password information, the method further comprises:
   receiving the identity password information inputted by the user and encrypting the ICCID of the Subscriber Identity Module with the received identity password information as a key and storing the encrypted ICCID.

3. The method according to claim 1, wherein before the user inputs the identity password information, the method further comprises:
   receiving the account password information inputted by the user and the account information used for logging in the client;
   encrypting the account information inputted by the user with the account password information as a key; and
   establishing the correspondence relationship between the identification of the client and the encrypted account information, and then storing the correspondence relationship.

4. The method according to claim 1, wherein when the identification of the client to be logged in currently by the user corresponds with multiple account information, select one account information from the multiple account information according to a set condition; and
   the set condition is: the account information is selected according to the priority of the account information or to the designation of the user.

5. A system for automatically logging in a client, the system having a hardware processor that comprises:
   a decryption module, adapted to decrypt an encrypted ICCID of a Subscriber Identity Module according to identity password information inputted by a user;
   a matching module, adapted to match the decrypted ICCID with a preset ICCID; an account determination module, adapted to determine account information corresponding to an identification of the client to be logged in currently by the user according to the correspondence relationship between the identification of the client and the account information when the matching is successful;
   wherein, the decryption module is also adapted to decrypt the determined account information according to account password information inputted by the user; and
   a login module is adapted to log in the client with the decrypted determined account information.

6. The system according to claim 5, wherein the system further comprising:
   an encryption module, adapted to receive identity password information inputted by the user and encrypt the ICCID of Subscriber Identity Module with the received identity password information as a key; and
   a memory module, adapted to store the encrypted ICCID.

7. The system according to claim 6, wherein,
   the encryption module is further adapted to receive the identity password information inputted by the user and the account information for logging in a client, and encrypt the account information inputted by the user with the account password information as a key; and
   the memory module is further adapted to establish the correspondence relationship between the identification of the client and the encrypted account information, and then store the correspondence relationship.

* * * * *